United States Patent
Shin et al.

(10) Patent No.: US 10,198,625 B1
(45) Date of Patent: Feb. 5, 2019

(54) ASSOCIATION OF UNIQUE PERSON TO A MOBILE DEVICE USING REPEAT FACE IMAGE MATCHING

(71) Applicants: Joonhwa Shin, State College, PA (US); Rajeev Sharma, State College, PA (US); Donghun Kim, State College, PA (US)

(72) Inventors: Joonhwa Shin, State College, PA (US); Rajeev Sharma, State College, PA (US); Donghun Kim, State College, PA (US)

(73) Assignee: VideoMining Corporation, State College, PA (US)

( * ) Notice: Subject to any disclaimer, the term of this patent is extended or adjusted under 35 U.S.C. 154(b) by 169 days.

(21) Appl. No.: 15/081,859

(22) Filed: Mar. 26, 2016

(51) Int. Cl.
| | |
|---|---|
| *H04N 7/18* | (2006.01) |
| *G06K 9/00* | (2006.01) |
| *H04W 4/02* | (2018.01) |
| *G06K 9/62* | (2006.01) |
| *G06T 7/20* | (2017.01) |
| *G06K 9/52* | (2006.01) |
| *G06F 17/30* | (2006.01) |

(52) U.S. Cl.
CPC ..... *G06K 9/00288* (2013.01); *G06F 17/3028* (2013.01); *G06F 17/30256* (2013.01); *G06F 17/30268* (2013.01); *G06K 9/00255* (2013.01); *G06K 9/00335* (2013.01); *G06K 9/52* (2013.01); *G06K 9/6215* (2013.01); *G06K 9/6218* (2013.01); *G06T 7/20* (2013.01); *H04W 4/02* (2013.01); *G06T 2207/30201* (2013.01)

(58) Field of Classification Search
CPC ................................. H04N 19/00; H04N 7/18

USPC ................................................. 348/142–160
See application file for complete search history.

(56) References Cited

U.S. PATENT DOCUMENTS

| | | | |
|---|---|---|---|
| 8,392,957 B2 | 5/2013 | Holt et al. | |
| 8,436,911 B2 | 5/2013 | Leebow | |
| 8,831,294 B2 | 9/2014 | Krupka et al. | |
| 8,891,835 B2 | 11/2014 | Cheswick | |
| 9,135,500 B2 | 9/2015 | Steiner | |
| 2009/0003662 A1 | 1/2009 | Joseph | |
| 2009/0252383 A1 | 10/2009 | Adam et al. | |
| 2009/0299961 A1* | 12/2009 | Lo | G06F 17/30247 |
| 2011/0013810 A1 | 1/2011 | Engström et al. | |
| 2012/0078700 A1 | 3/2012 | Pugliese et al. | |

(Continued)

*Primary Examiner* — Anand S Rao

(57) ABSTRACT

A method and system for associating a physically identifiable feature of a person with the unique identifier of a mobile device carried by the person as detected across repeat visits to a physical location or multiple locations. Specifically, associating the face of a repeat visitor with a unique identifier of a mobile device, such as the device's MAC address, by means of a repeat visit analysis without any explicit or voluntary participation of the person, for example, in a form of providing their information by participation in a survey. For each detection of a particular MAC address associated with a mobile device at a particular physical location, a set of candidate faces can be captured at that physical location. Revisiting faces can be identified and grouped together, and a probability that each group of faces is associated with a particular MAC address can then be calculated. After satisfying several constraints, a maximum probability can be determined, resulting in a match of a particular face to a particular MAC address.

24 Claims, 17 Drawing Sheets

(56) References Cited

U.S. PATENT DOCUMENTS

| | | |
|---|---|---|
| 2013/0108114 A1 | 5/2013 | Aviad et al. |
| 2013/0121584 A1* | 5/2013 | Bourdev ............ G06K 9/00281 |
| | | 382/190 |
| 2013/0259327 A1 | 10/2013 | Cheswick |
| 2014/0172627 A1 | 6/2014 | Levy et al. |
| 2014/0379480 A1 | 12/2014 | Rao et al. |
| 2015/0242980 A1 | 8/2015 | Henry et al. |
| 2015/0363798 A1 | 12/2015 | Aihara et al. |

* cited by examiner

Candidate Faces

| # of Visits: 4 | A | B | C | D | E | F | G | H | I | J |
|---|---|---|---|---|---|---|---|---|---|---|
| Appearance % : | 4/4 | 2/4 | 1/4 | 1/4 | 1/4 | 1/4 | 1/4 | 1/4 | 1/4 | 1/4 |

Visit 5: K L

FIG. 15

ASSOCIATION OF UNIQUE PERSON TO A MOBILE DEVICE USING REPEAT FACE IMAGE MATCHING

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

Field of the Invention

This disclosure presents a method and system regarding the facial recognition, repeat visit analysis, multi-modal sensing, tracking and analytics, pattern recognition, data fusion, and specifically for the association of tracked faces with a unique identifier from a mobile device.

Background of the Invention

There can be many reasons to track repeat visitors to a physical location. A retailer may have a need to track repeat shoppers at a store. Security personnel may want to track repeat visitors to an airport, sporting venue, or other location. Accurately identifying repeat visitors can be a challenge. There is a need to establish a way to reliably and uniquely identify the repeat visitor.

The visit of a person to a physical location can be detected and tracked directly by employing vision-based human detection and tracking methods along with proper deployment of cameras. While this can result in very accurate tracking of a person's position within a location, there can be significant uncertainty with regard to identifying the same person over multiple visits even with a proper face identification method. The visit of a person to a physical location can also be detected and tracked indirectly by detecting the appearance of a mobile device within the location. Using a unique identifier (such as a MAC address) of the mobile device, one can easily determine repeat visitors. While this technique may be useful for positively identifying when a person (via the mobile device) has visited a location, it affords weak location resolution in space and time. Therefore, there is a need to associate face data with unique mobile identifier information in order to reduce uncertainty when identifying and tracking repeat visitors.

BRIEF SUMMARY OF THE INVENTION

A method and system for associating a physically identifiable feature of a person with a unique identifier of a mobile device utilizing at least a camera, at least a mobile signal sensor, and at least a processor for the association comprising the following steps, repeated for each visit of the mobile device: detecting the unique identifier of the mobile device using a mobile signal sensor for at least one physical location using a Mobile Device Visit Detection module, capturing a plurality of input images of a face of at least a person at the physical location using at least a camera using a Candidate Face Collection module, storing the unique identifier of the mobile device and plurality of input images in a database, clustering the plurality of input images using a Face Clustering module, and matching a particular face image to a particular mobile device using a Face to Mobile Matching module.

An exemplary embodiment can be a method and system for associating the physically identifiable feature (PIF) of an individual person with the ID of a mobile device carried by the person by means of a repeat visit analysis without any explicit or voluntary participation of the person, for example, in a form of providing their information by participation in a survey. The PIF of a person can include the face of the person that is assumed to be unique enough to be used as an ID for the person. The face can specifically be used as an exemplary representation of the PIF of a person, but the PIF is not limited to the face only.

A typical scenario where an embodiment can be applied can include a case where a plurality of individuals visit repeatedly at least one of the physical spaces where a set of sensors can capture the visual appearance of a person and another set of sensors can capture the signal transmitted from the mobile device carried by the person. By analyzing data collected during the repeated visits, an association can be made to match the visual appearance (for example, facial features) of a person with the ID of the mobile device.

BRIEF DESCRIPTION OF DRAWINGS

FIG. 11-16 illustrate a detailed example of an exemplary embodiment of the data association process.

DETAILED DESCRIPTION

In the following description, numerous specific details are set forth. However, it is understood that embodiments of the invention may be practiced without these specific details. In other instances, well-known circuits, structures and/or techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Further, while the steps provided are presented in a particular order, the process is not limited to the particular ordering of steps presented. Some embodiments may include steps in the same or different order than the steps provided in the process description.

SYSTEM DEPLOYMENT AND OVERVIEW

Figure 1:
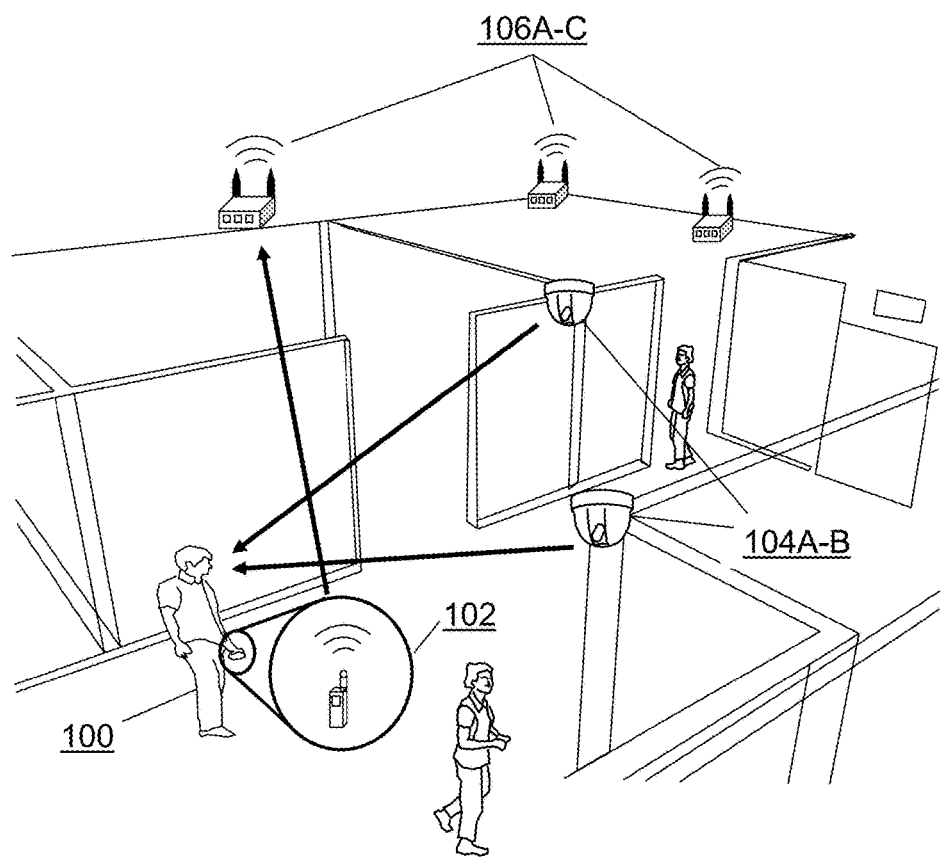
FIG. 1 shows an exemplary application of an embodiment in a physical location.

FIG. 1 shows an overview of an application where an exemplary embodiment is deployed and used at a physical space at a location. The physical space can be covered by a set of cameras 104A-B in such a way that the cameras can capture the faces of the persons present in the physical space. In some cases, the best place to capture the faces of the persons at the location is at an entrance and/or exit to the physical space, since everyone may pass through a relatively narrow pathway and/or doors, and all faces tend to be directed toward a single direction. In this example, the cameras 104A-B can capture the faces of the persons present, including a person 100 carrying a mobile device 102. The presence of the mobile device 102 carried by the person 100 can be detected by one or more of the access points (APs) (or any mobile signal sensors that is capable of sensing mobile radio signals including WiFi and Bluetooth) 106A-C, when the mobile device 102 is within range of one or more of the APs 106A-C.

Figure 2:
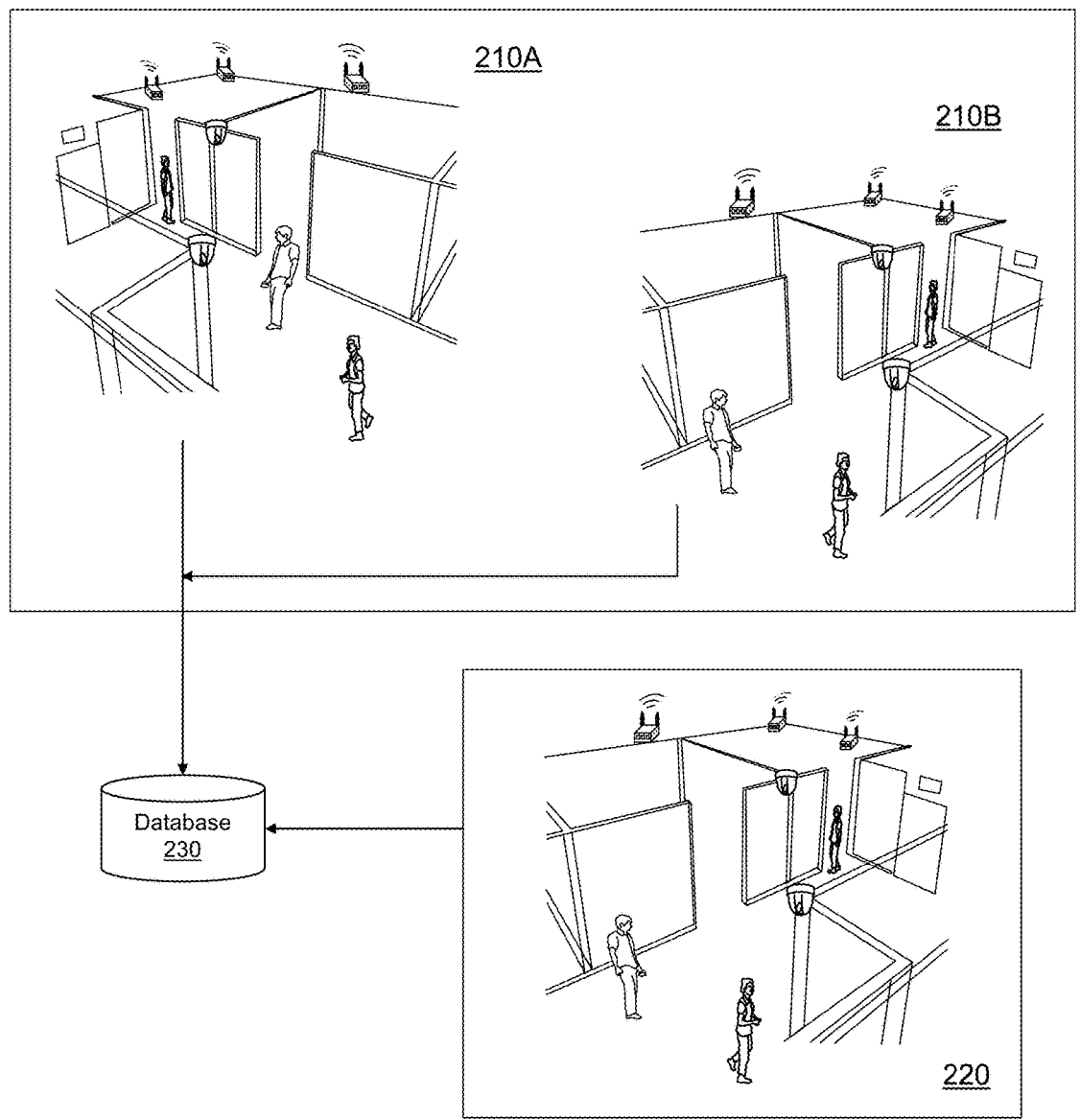
FIG. 2 shows an exemplary application of an embodiment at multiple physical locations in a geographic area.

While the deployment illustrated in FIG. 1 shows a single physical space at a single location, FIG. 2 shows example embodiments that can include multiple similar deployments of cameras. In an embodiment, a single or multiple deployment of cameras, such as in 104A-B, and APs, such as in 106A-C, can be placed at physical spaces (e.g., Door 1 and Door 2) within a particular location (e.g., Office A), as shown in 210A and 210B. Further, in another embodiment, a single or multiple deployment of cameras, such as in 104A-B, and APs, such as in 106A-C, can be placed at different locations (e.g., Office A and Shopping Mall B), as shown in 220. In either case, data from the different locations can be transmitted via a network to a common computing system for storage in a database 230 and processing. So, given these embodiments, the exemplary deployment can occur as a single instance at a single location, as multiple instances at a single location, or as multiple instances across multiple locations.

Figure 3:
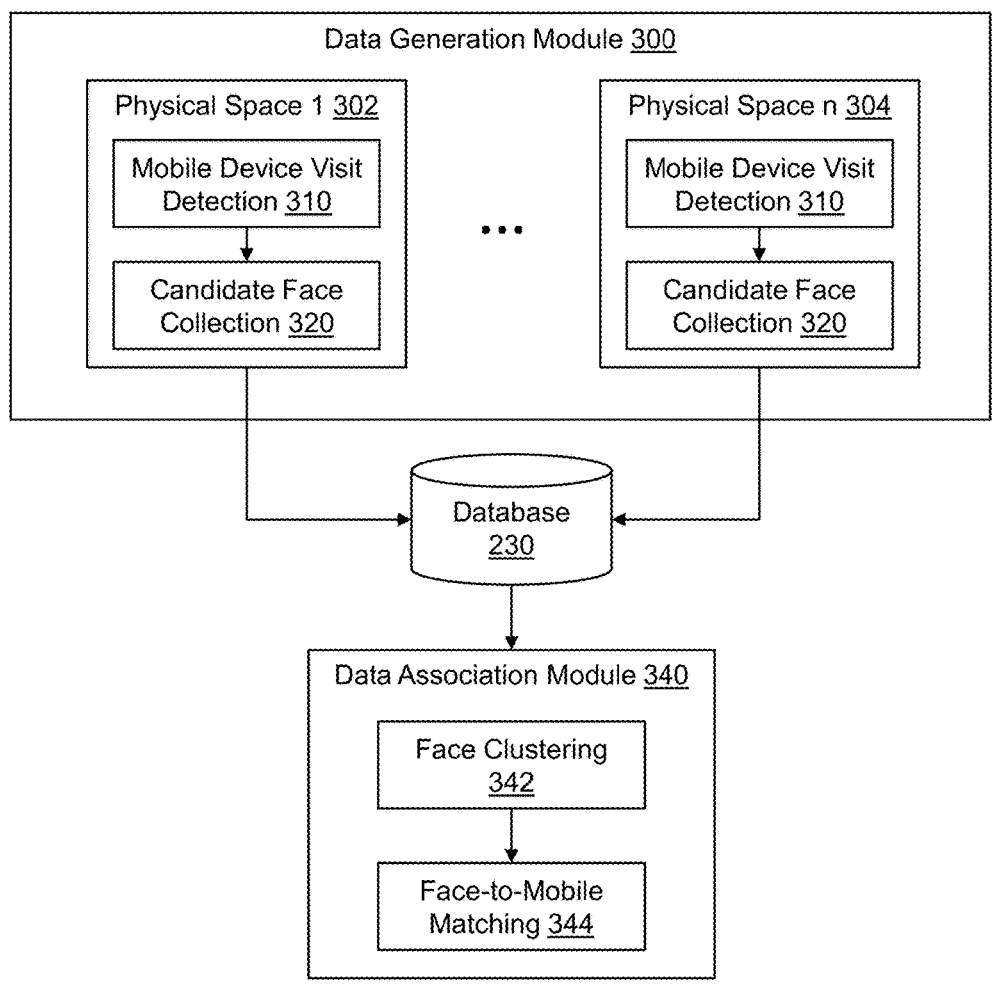
FIG. 3 shows an example block flow diagram for the data association process.

FIG. 3 shows a block flow diagram overview of an exemplary embodiment of the data association process. For each physical space 302 and 304, the Data Generation Module 300 can detect the presence of a mobile device 102. When a device is within the range of an AP, the AP can capture a signal from the mobile device using the Mobile Device Visit Detection 310 module. The signal from the mobile device can also include a unique identifier from the mobile device. In a preferred embodiment, the unique identifier detected by the AP of the mobile device can be the MAC address of a radio in the mobile device, including Bluetooth, WiFi, Nearfield Communication (NFC), and some other identification. In addition to the MAC address, the Data Generation Module 300 can record a time stamp indicating the time or range of time when the device was present and detectable.

During the range of time when a mobile device is detected, the Candidate Face Collection 320 module can capture images of the faces of persons present in the physical space. The captured images can also include a time stamp indicating the time when the image was captured. The actual location of the faces when captured may also be collected as meta-data so that the face location and/or time information can be later used when being associated with a mobile device.

Mobile signal and image data from each of the physical spaces created by the Data Generation Module 300 can be stored in a database 230. The Data Association Module 340 can access data from the database 230 in order to match face images to the captured MAC address. Face images that are similar can be clustered into groups by the Face Clustering 342 module. Finally, the most probable match of a face group for each captured MAC address can be identified using the Face-to-Mobile Matching 344 module.

More details about each of the modules will be provided below.

Mobile Tracking

Figure 4:
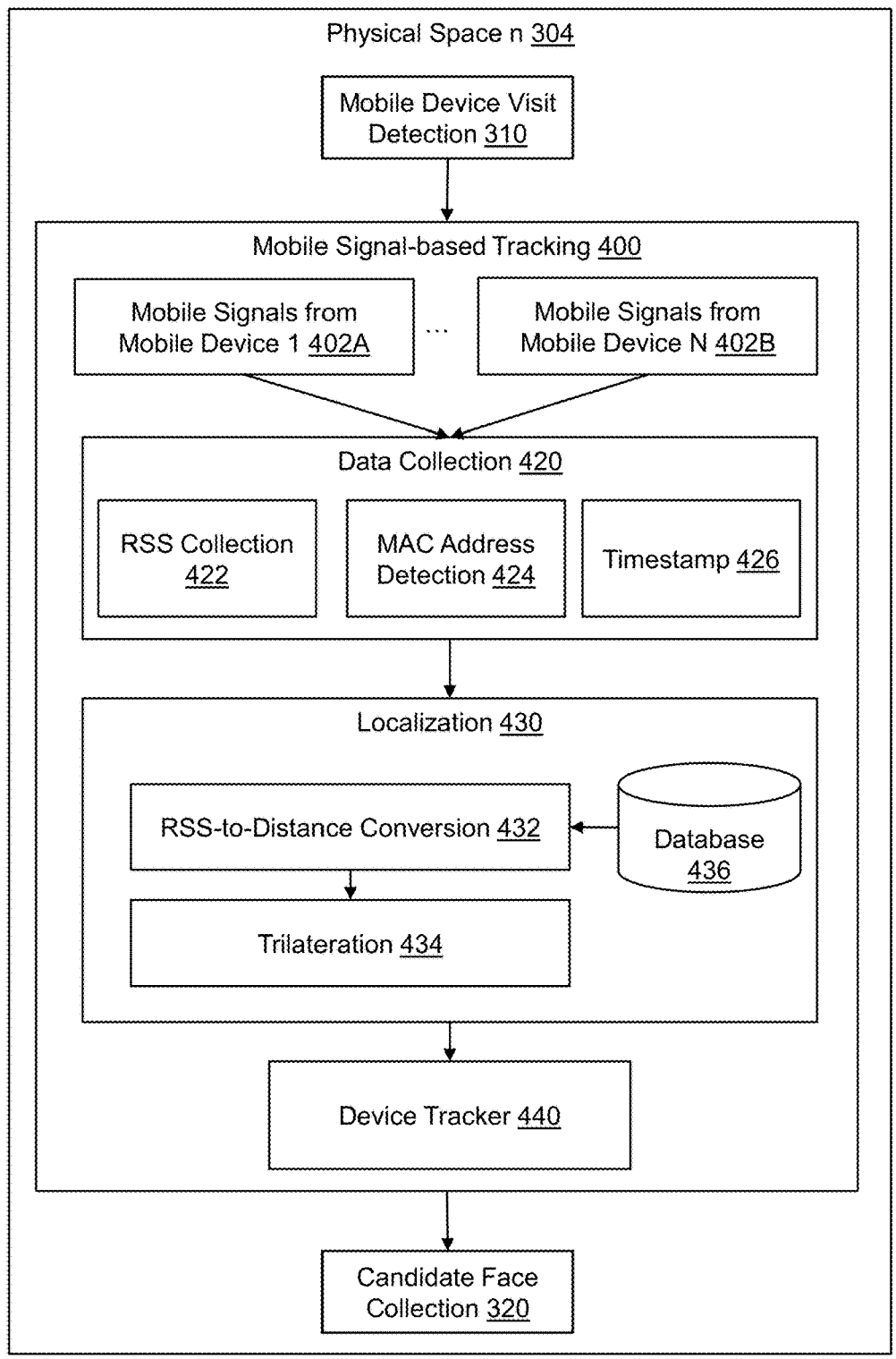
FIG. 4 shows an example block flow diagram for the Mobile Signal-based Tracking module.

FIG. 4 shows an embodiment of the Data Generation Module 300 that includes a Mobile Signal-based Tracking 400 module (illustrated in this example for a single Physical Space n 304). In addition to detecting the presence of a mobile device and its associated MAC address, an embodiment can track the location of a person carrying a mobile device as they travel the physical space. The tracking of the mobile device and use of location information can improve the performance of the data association process by associating the calculated location of the mobile device with the known location of a camera and its field of view.

FIG. 1 shows an exemplary embodiment for Wi-Fi sensor deployment. For Wi-Fi based tracking, we can also assume that a set of Wi-Fi signal sensors 106 A-C, which will also be referred to as access points (i.e., mobile signal sensors) or simply APs, can be deployed in an area of interest where the sensing range of the set of APs 106 A-C can cover the area with a certain sensing density p, where the sensing density p is defined as the level of overlap of the sensing range of the APs 106 A-C of the area. If an area is covered by APs 106 A-C with a density p, then it can mean that any point in the area is covered by at least p number of APs at any time. The value of p can be determined differently depending on the employed algorithms and environments. For example, for trilateration based Wi-Fi device localization schemes, p could be at least three while for triangulation based ones, p could be at least two. In a preferred embodiment where trilateration can be used as a localization method, the APs 106 A-C are usually deployed with the value of p being four, which is empirically determined to be a balanced tradeoff between cost and robustness.

The deployed APs 106 A-C can be calibrated in terms of Received Signal Strength-to-distance, RSS-to-distance, or radio fingerprint-to-location mapping. Both RSS-to-distance and radio fingerprint-to-location mapping are methods well-known in the art. FIG. 4 shows an exemplary block flow diagram of the Mobile Signal-based Tracking 400 module. In one embodiment, localization 430 can be calculated using an RSS-to-distance mapping function in the RSS-to-Distance Conversion module 432. Due to the wireless signal propagation characteristics, the power of the signal decreases as the source of the signal gets farther. The relationship between the RSS and the distance from the source can be estimated by constructing a mapping function based on a set of ground truth measurements. Using the RSS-to-distance mapping function in the RSS-to-Distance Conversion module 432, a trilateration-based localization 434 can be performed if there are at least three RSS measurements available for a person at a given time instant. The RSS-to-distance mapping function in the RSS-to-Distance Conversion module 432 may be learned without any prior data if a self-calibration method is employed, which takes advantage of already-known locations of APs and their signals that are stored in a Database 436. In another embodiment, a radio fingerprint for an area of interest can be generated using a set of measurements from multiple APs for a Wi-Fi source at known positions. The radio fingerprint-to-location mapping can be used to localize a source of Wi-Fi signals.

A computing machine and APs 106 A-C can track the mobile signals 402 A-B of persons of interest in the Mobile Signal-based Tracking 400 module. Given N number of APs 106 A-C deployed in an area of interest with a certain density p, each AP can be constantly searching for wireless signals 402 A-B of interest in a certain channel or multiple channels simultaneously if equipped with multiple radios. The AP with a single radio may hop over different channels to detect such mobile signals 402 A-B that could be transmitted from mobile devices present in the area. APs 106 A-C can search for mobile signals 402 A-B because mobile devices are likely to look for an AP for potential connection that may be initiated in the near future if the user of the mobile device attempts to use a wireless connection.

To get and maintain a list of nearby APs 106 A-C, most mobile devices 102 usually perform a type of AP discovery process if their radio is turned on. The mobile devices tend to transmit a short packet periodically (i.e., Probe Request in the 802.11 standard) with a certain time interval between transmissions to discover accessible APs nearby. The time interval depends on the type of the operating system (OS) of the mobile device (e.g., iOS, Android, etc.) and the current state of the mobile device in terms of, for instance, whether the applications of the mobile device are currently running actively or in background, or whether the display of the mobile device is on or off. In general, if the display of a mobile device is on, then the OS puts the device in an active state, resulting in the interval getting shorter and transmission rate being increasing. If the display is off, then the OS would gradually put the device into a sleep state through multiple stages.

Once mobile signals 402A-B (typically in the form of packets) are transmitted from a mobile device 102 via wireless communications, then a subset of APs 106 A-C around the mobile device can detect the packets if the APs happen to be listening at the same or an adjacent channel. The APs 106 A-C at an adjacent channel may be able to detect the packet since a Wi-Fi channel spectrum spans wider than the frequency width allocated for a channel. When a packet is detected at an AP 106 A-C, a data collection 420 process can occur where the PHY layer and MAC layer information of the packet can be retrieved which can include the Received Signal Strength (RSS) 422 and the MAC address 424 while a timestamp 426 of the packet detection can be marked in the Data Collection module 420. The value of the RSS may be available in terms of the RSS Indicator (RSSI), and this value may vary significantly even during a short time period due to various signal distortions and interferences. To reduce such noise and variation, the RSS values may undergo a noise reduction process during a set of consecutive receptions. In case of multiple mobile devices present, the unique MAC address 424 or ID of mobile devices 102 can be used to filter and aggregate the measurements separately for each individual mobile device.

In the localization 430 method, the values of the RSS readings can be converted to a real-world distance from each AP 106 A-C by utilizing the pre-learned RSS-to-distance mapping function for each AP 106 A-C in the RSS-to-Distance Conversion module 432, which could be stored in a database 436. If there are distance measurements from at least three different APs 106 A-C available, then a single location can be estimated by, for example, employing a trilateration-based approach 434. The estimated current location can then be fed into a tracker (e.g., Kalman filter and Particle filter) with the unique ID, the MAC address 424, so that the optimal current location and thus trajectory can be estimated in a stochastic framework in the mobile Device Tracker 440 module. The trajectory along with the specific MAC address can then be stored in the Database 230.

Data Association Algorithm

Figure 5:
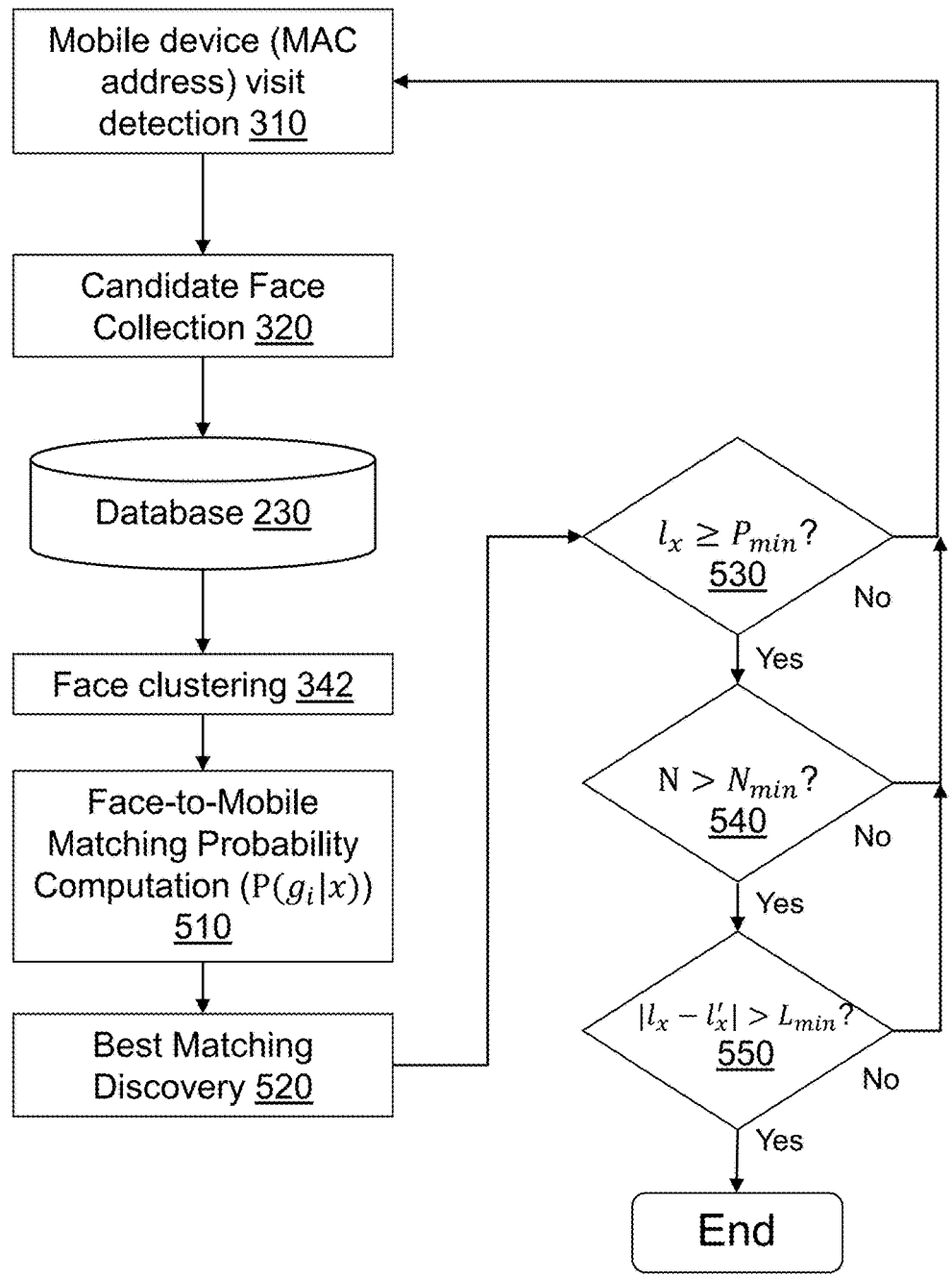
FIG. 5 shows an example process flow diagram for the data association process.

FIG. 5 provides a process flow diagram for the data association algorithm.

The data association process can begin by defining X to be the MAC address of a mobile device 102 carried by a person 100. For the $i^{th}$ visit of a MAC address x to a physical space during a range of time, $[t_{in}, t_{out}]$, as detected using the Mobile Device Visit Detection module 310, and as illustrated in FIG. 1, a set of face images $f_i$ of persons can be collected (by the Candidate Face Collection 320 module) who also visited the physical space at time t, where $t_{in} - \Delta t < t < t_{out} + \Delta t$:

$$f_i = \{f_{i1}, f_{i2}, \ldots, f_{iv_i}\},$$

where $v_i$ can be the number of faces captured at t, where $t_{in} - \Delta t < t < t_{out} + \Delta t$.

It can be noted that $f_{ij}$ (where $1 \leq j \leq v_i$) may be a single face for a person $s_j$ or a set of faces of the same person $s_j$ captured using a face tracker.

The range of time when faces can be captured, $[t_{in} - \Delta t, t_{out} + \Delta t]$, corresponds to the time when the APs can detect a mobile device having the particular MAC address. As detection of the mobile device by the APs may not occur instantaneously (for example, a mobile device may only broadcast its presence once every several seconds) as the device enters the area, the $\Delta t$ term may be included to account for those detection delays. Further, the time t can be a single instant of time, or many instances of time within the time period that the mobile device is detected by the APs.

When the time period $[t_{in}, t_{out}]$ associated with the visit by a mobile device having a particular MAC address is completed, candidate face images that were captured during the period $[t_{in} - \Delta t, t_{out} + \Delta t]$ can be collected by a face detection and tracking algorithm within the Candidate Face Collection 320 module. Then, all the candidate faces collected during the period $[t_{in} - \Delta t, t_{out} + \Delta t]$ can be stored in a database 230.

Figure 6:
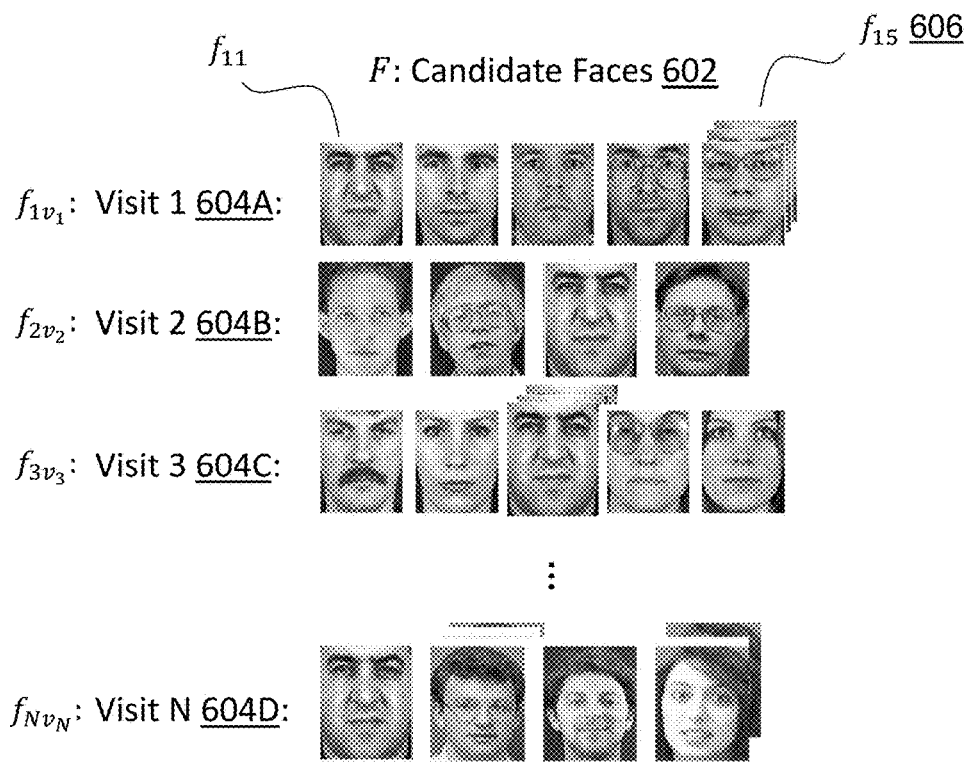
FIG. 6 shows an exemplary set of candidate faces for multiple visits of a MAC address.

Next, as illustrated in FIG. 6, a union of the candidate face sets 602, $F = \{f_1, f_2, \ldots, f_N\}$, can be constructed, where N is the total number of visits associated with the MAC address x. The candidate faces associated with each visit 604A-D by a particular MAC address can form the rows of the figure. The union of faces can comprise the faces captured across all of the rows.

Note that if an element in $f_i$ represents a set of faces for the same person (since they are collected by a face tracker), then such face subgroups (that are already determined to correspond to the same person) could be maintained throughout the following face clustering process as if they are the same face. The face subgroup $f_{15}$ 606 in FIG. 6 is an example for that, where three faces for the same person can be captured and collected together by a face tracker.

Figure 7:
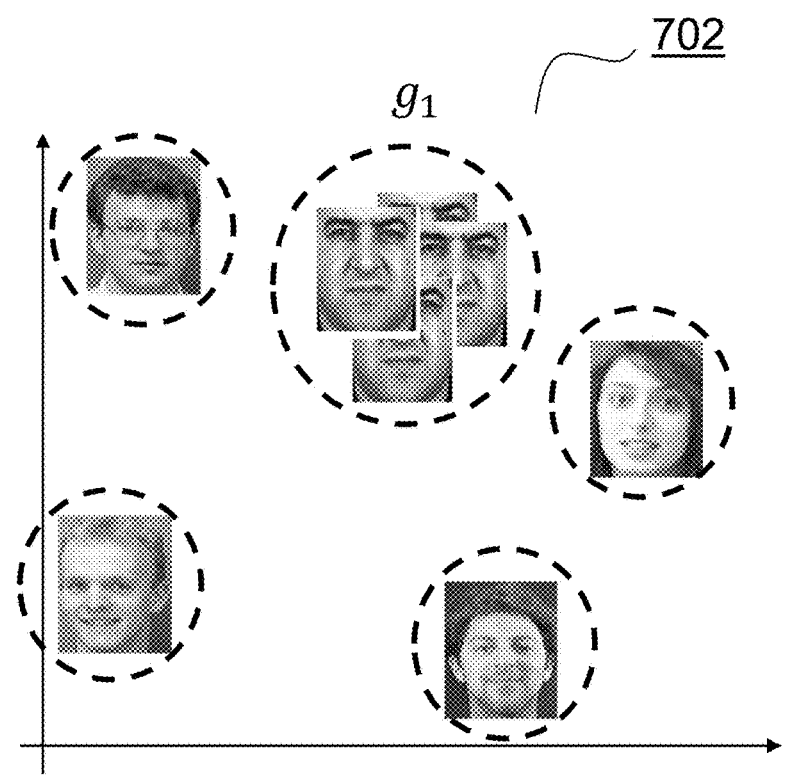
FIG. 7 shows example output of the Face Clustering module.

Next, as illustrated in FIG. 7, the face sets can be clustered into multiple groups 702 based on the similarity of the faces in a feature space by a clustering operator T(•), using the Face Clustering 342 module. M can denote the total number of clusters of the similar faces (which would be the number of actual persons in the physical space, theoretically), $$g=T(f), \text{ where } f \in F = \{f_1, f_2, \ldots, f_N\} \text{ and } g \in G = \{g_1, g_2, \ldots, g_M\}.$$

Figure 8:
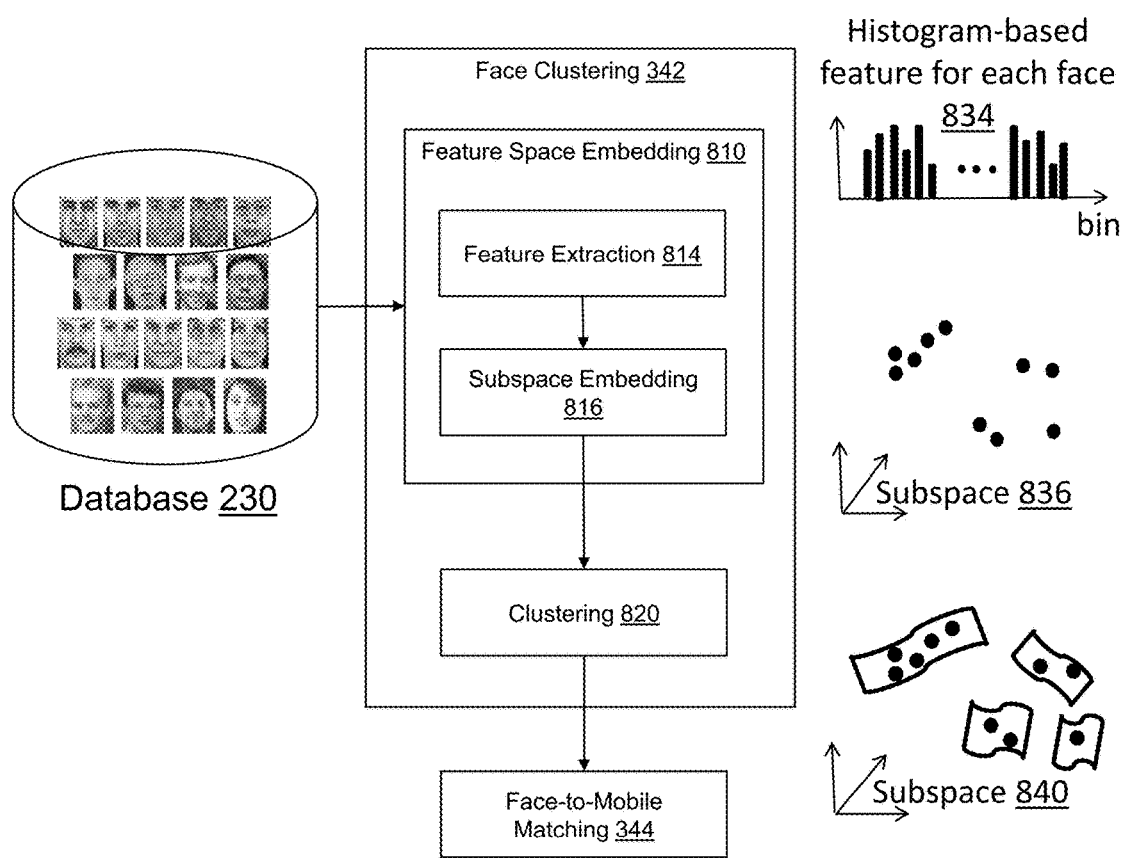
FIG. 8 shows a detailed block flow diagram of the Face Clustering module with example output from exemplary modules.

In an embodiment, face clustering 342 can further comprise two steps: feature space embedding 810 and clustering 820 in the feature space, as shown in FIG. 8.

$$g=T(H(f)), \text{ where } f \in F = \{f_1, f_2, \ldots, f_N\} \text{ and } g \in G = \{g_1, g_2, \ldots, g_M\},$$

where H(•) refers to a feature space embedding operator which maps the faces into the feature space.

Feature Space Embedding 810 can consist of Feature Extraction 814 and Subspace Embedding 816. The Subspace Embedding 816 can be a mapping from an original feature space to a lower dimensional subspace with an orthonormal coordinate system. Accordingly, the feature space can be defined by this subspace.

For the Feature Extraction 814, each candidate face can be initially represented by some features such as (but not limited to) pixel intensity, LBP (Local Binary Pattern), HOG (Histogram of Oriented Gradient), and BIF (Biologically Inspired Feature), an example output of which is illustrated in 834. All representations can be based on the local or global characteristics in the candidate face images. Then, a feature or a mixture of features can be used as the input to the Subspace Embedding module 816 or the Clustering module 820 directly.

When the mixture of features is used, Subspace Embedding 816 can alleviate the redundancy by finding characterized orthogonal coordinates like PCA (Principal Component Analysis), LLE (Local Linear Embedding), and ISOMAP (ISOmetric Mapping). In this case, the Subspace Embedding 816 can improve the discrimination between different persons' faces. An example output illustration of the Subspace Embedding 816 is shown in 836.

Given the feature space, the face clustering 820 can be based on an appropriate similarity measure and a specific clustering method. An example output illustration of clustering 820 is shown in 840.

In an embodiment, PCA-based subspace embedding can produce the feature space in a Euclidean space so that a geometric distance like the Euclidean distance in the feature space can be used as a similarity measure. The more similar the two candidate face images are, the smaller their geometric distance in the feature space becomes. After performing the subspace embedding to all candidate face images, a Hierarchical Clustering Analysis or an Iterative K-Mean clustering can be applied as a face clustering method. In the meanwhile, the number of clusters may be determined by a given similarity threshold.

In another embodiment, the face images can be clustered on a manifold based on the fact that the same person's faces with varying parameters (such as facial pose, illumination, etc.) reside on a manifold in an embedded feature subspace like ISOMAP. In this case, the similarity measure can be determined by a geodesic distance metric on the manifold. Given the feature space and the similarity measure, the face clustering can be carried out by a clustering method including, but not limited to, a Hierarchical Clustering Analysis and an Iterative K-mean clustering. Here, the number of clusters can be determined by a given similarity threshold.

Next, the probability $P(g_i|x)$ that a group of faces, $g_i$ corresponds to the MAC address x, where $1 \le i \le M$, can be computed using the Face-to-Mobile Matching Probability Computation 510 module. An example output of this process is illustrated in 904 of FIG. 9.

An embodiment on how to compute such probability may be based on how frequently a same face visits a physical space at the times when the MAC address x is detected within the physical space, which can be described as the relative rate of visits by a face compared to the visits by a MAC address.

To formulate the problem more concretely, $V(g_i)$ can be defined as the number of visits by the face group $g_i$ and N, as above, can be the number of visits by the MAC address x.

Then the relative visit rate of a face group $g_i$ with regard to x, $r_{x,i}$, can be found by $$r_{x,i} = \frac{V(g_i)}{N}.$$

Figure 9:
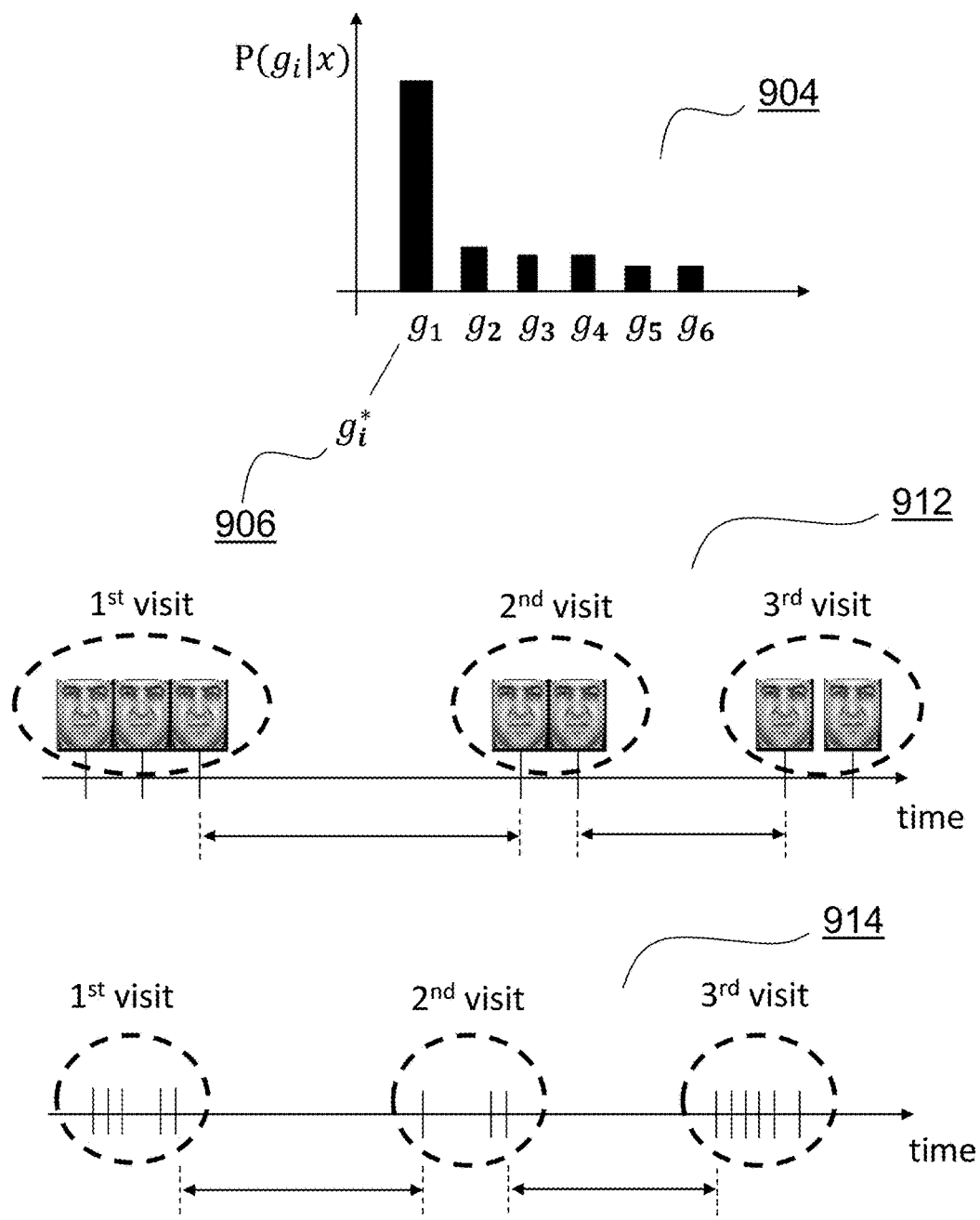
FIG. 9 illustrates steps used to calculate face-to-mobile matching probability.

FIG. 9, 912, illustrates how $V(g_i)$ can be computed by: (1) further grouping the faces in the face group $g_i$ based on the capture time in such a way that the faces captured consecutively within a time bound (e.g., 1 hour) are grouped together, assuming that they are captured in a single visit, and (2) then counting the number of such groups, assuming each group of faces represents a single visit.

N can also be computed similarly with respect to the detection time of the MAC address, as shown in 914.

Note that determining whether two consecutive appearances of a face belong to the same visit or not (1) may be based solely on a time difference of the two appearances or (2) may also be based on the location of the faces captured in the case where the captured face locations are available in the form of, for example, their world coordinates or just the location of the cameras that captured the faces. Therefore, if the faces are captured in two different locations that are distant enough to each other, they may be defined as two different visit although they may be captured not too distant in time.

One example case for this would be, for example, a large mall where there are two doors in an opposite side and a shopper enters from a door and exits though the other door. In this case, the shopper's face may be considered to appear in two different physical locations (i.e., two different visits) although the shopper may spend only few minutes within the mall.

The aforementioned way of defining a visit can also apply to the mobile device when at least a rough location of the mobile devices are available by means of a mobile device tracker or a proximity sensor.

Using the Face-to-Mobile Matching Probability Computation 510 module, $r_{x,i}$ can be converted into a probability measure $r'_{x,i}$ through a normalization process:

$$r'_{x,i} = \frac{r_{x,i}}{\sum_{i=1}^{M} r_{x,i}}$$

$P(g_i|x)$ can then be computed as $r'_{x,i}$ in an embodiment.

Given the probability measure $r'_{x,i}$, now, using the Best Matching Discovery 520 module, the face group $g^*_i$ 906 can be found that maximizes the probability $P(g_i|x)$ subject to the probability being no less than a threshold $P_{min}$, as illustrated in 530.

The maximum probability can be defined as $$l_x = \max_{1 \le i \le M} P(g_i | x).$$

Then, the face group $g^*_i$ 906 can be found by $$i^* = \underset{1 \le i \le M}{\mathrm{argmax}} P(g_i | x), \text{ subject to } l_x \ge P_{min}.$$

In an embodiment, this can then be computed first by defining the max probability as $$o_x = \max_{1 \le i \le M} r'_{x,i},$$

and then by finding $$i^* = \underset{1 \le i \le M}{\mathrm{argmax}} r'_{x,i}, \text{ subject to } o_x \ge P_{min}.$$

It can be undesirable to find such face group when the total number of visits of a MAC address is too small. Therefore, the minimum number of visits by the MAC address $N_{min}$ can be added as an additional constraint, as illustrated in 540:

$$i^* = \underset{1 \le i \le M}{\mathrm{argmax}} P(g_i | x), \text{ subject to } l_x \ge P_{min} \text{ and } N > N_{min},$$

which can be computed in an embodiment as $$i^* = \underset{1 \le i \le M}{\mathrm{argmax}} r'_{x,i}, \text{ subject to } o_x \ge P_{min} \text{ and } N > N_{min}.$$

Also, it may be undesirable to associate a MAC address to a face group when there's another compelling face group whose probability is too close to the G. Therefore, in an embodiment, another constraint may be added:

The second-most maximum probability can be defined as $l'_x$. Then the difference between the first and second maximum probability should be larger than a threshold $L_{min}$, as illustrated in 550:

$$i^* = \underset{1 \le i \le M}{\mathrm{argmax}} P(g_i | x), \text{ subject to } l_x \ge P_{min}, N > N_{min},$$

$$\text{and } |l_x - l'_x| > L_{min}.$$

Once i* is found, the group of faces found $g^*_i$ 606 can then be associated with the MAC address x.

Figure 10:
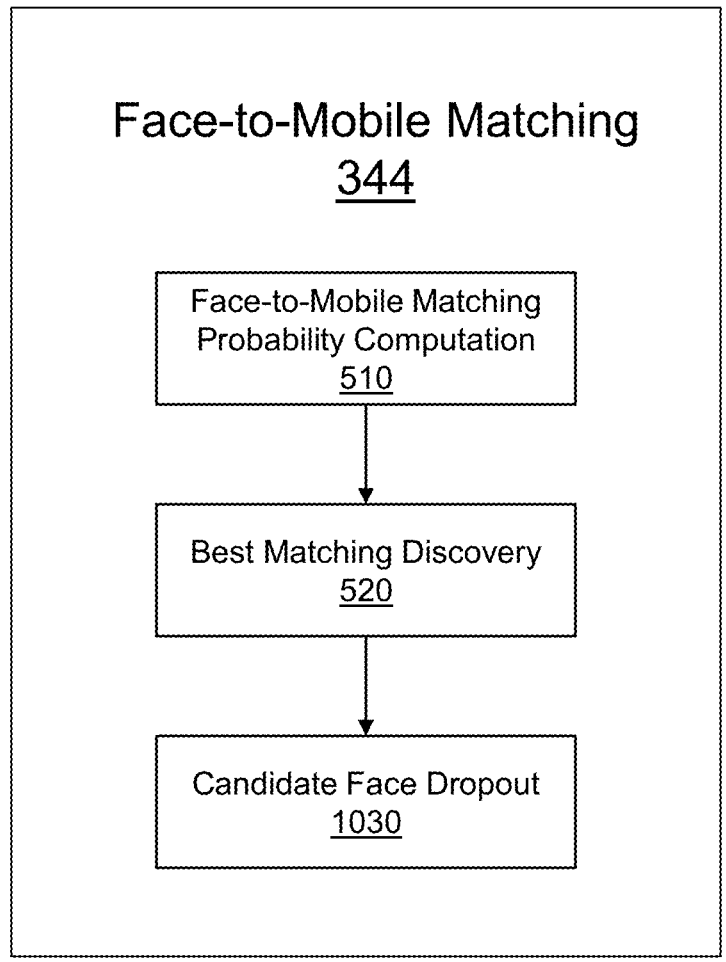
FIG. 10 shows a detailed block flow diagram of an embodiment of the Face-to-Mobile Matching module.

Note that the data association process, as illustrated in FIG. 5, can be performed iteratively whenever a new visit of the MAC address x is detected and its candidate face images are newly acquired accordingly. In an embodiment that is shown in FIG. 10, at each iteration, a candidate face group $g_i$ whose $P(g_i|x)$ is less than the threshold $P_{min}$ may be dropped from consideration as shown in the Candidate Face Dropout module 1030. Dropping low-probability groups can result in the candidate face group G not ever-growing (that is, M is not ever-increasing), helping to reduce computation time of the process.

DETAILED EXAMPLE AND APPLICATIONS

There can be many applications for the exemplary embodiments presented. One possible application can be for the association of a shopper's face with the MAC address of that shopper's mobile device as the shopper makes multiple visits to a physical space in a retail location over time. It can be noted that in addition to visiting the same physical space over time, the shopper could be detected visiting a different physical space in the same retail location. Further, the shopper could be detected in different physical spaces in different retail locations. As long as the shopper's face and the MAC address of the shopper's mobile device can be detected on multiple occasions over time, the association process can occur.

Figure 11:
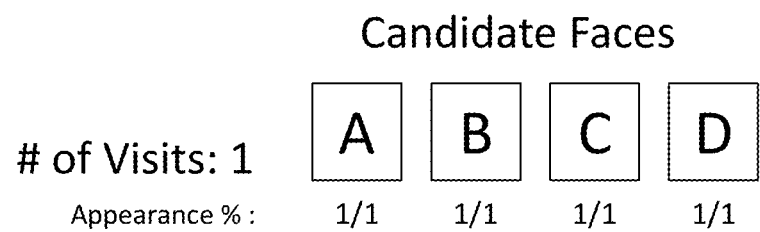

FIG. 11 shows the first step of a detailed example of an exemplary embodiment. A set of candidate faces can be captured for the first visit of a shopper carrying a mobile device possessing a MAC address as a unique identifier. In this example, four candidate faces, A, B, C, and D, were detected within a range of time that the shopper's mobile device was detected by an AP as being present in the physical space. It can be assumed that the Candidate Faces identified have already been clustered into groups consisting of the same shopper. Since this can be the first time that the mobile device containing that particular MAC address was detected, the "# of Visits" indicator can be set to 1. Further, there is an indication of how many times that each of the Candidate Faces has been detected for each detection of the particular MAC address, labeled the "Appearance %." In this case, since it is the first appearance of the MAC address, each face has a 1/1 appearance percentage. As the minimum number of visits by the MAC address is set to 5 in this example, the process will continue until the "# of Visits" indicator reaches 5 visits.

Figure 12:
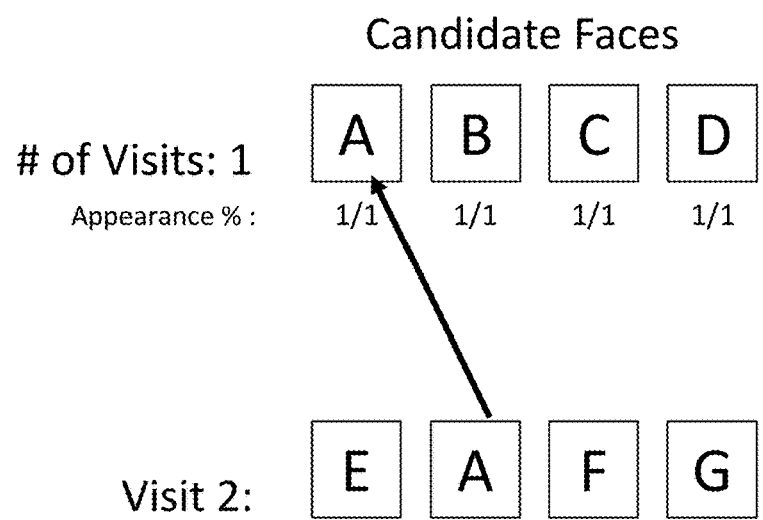

FIG. 12 shows the second visit of the MAC address. The Candidate Faces detected for Visit 2 are E, A, F, and G. A face verification test can show that face A is a repeat visitor. The "# of Visits" and "Appearance %" indicators can then be updated during the next iteration.

Figure 13:
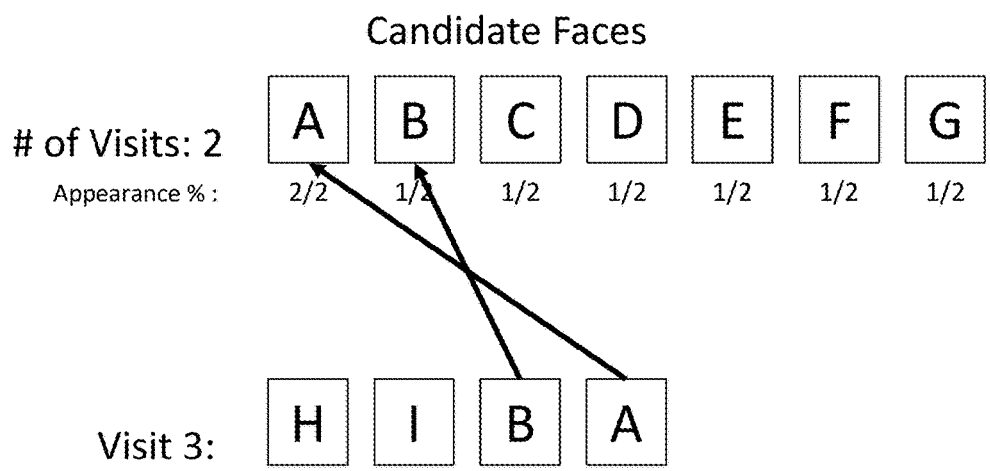

FIG. 13 shows the third visit of the MAC address and the intermediate results of the collected candidate face images until the second visit of the MAC address. In this case, faces H, I, B, and A are detected. It can also be seen that the "# of Visits" indicator (which shows the results until the latest measurements) has been updated to 2 and the "Appearance %" indicator has been updated to show that face A has appeared in 2 out of 2 visits by the MAC address, while faces B, C, D, E, F, and G have appeared in 1 out of 2 visits.

Figure 14:
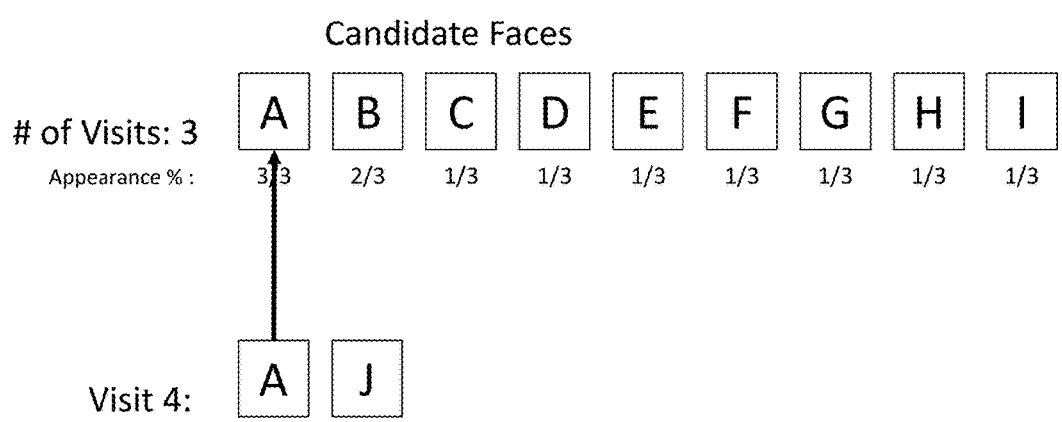

FIG. 14 shows the fourth visit of the MAC address and the intermediate results of the collected candidate face images until the third visit of the MAC address. In this instance, faces A and J are detected, with A being a repeat visitor. It can also be seen that the "# of Visits" indicator has been updated to 3 and the "Appearance %" indicator has been updated to show that face A has appeared in 3 of 3 visits, face B has appeared in 2 of 3 visits, and faces C, D, E, F, G, H, and I have appeared in 1 of 3 visits.

FIG. 15 shows the fifth visit of the MAC address. In this case, there were no repeat faces detected, as it was the first detection of faces K and L. This illustrates the possibility that a face may be misidentified, a mobile device may be carried by a different individual (such as a friend or family member of the shopper who carried the device in previous visits), or that even if the same shopper carries the mobile device, there may be times that the shopper's face is not detected. There are a number of reasons why a shopper may not be detected. For example, the shopper may have changed their look, modified facial hair or makeup, or was wearing some concealing clothing such as a hat. It is also possible that the person was misidentified by the system. It can also be seen that the "# of Visits" indicator has been updated to 4 and the "Appearance %" indicator has been updated to show that face A has appeared in 4 of 4 visits, face B has appeared in 2 of 4 visits, and faces C, D, E, F, G, H, I, and J have appeared in 1 of 4 visits.

Figure 16:
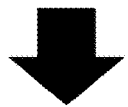

FIG. 16 shows the "# of Visits" indicator updated to show 5. It can be seen that the "Appearance %" indicator has been updated to show that face A has appeared in 4 of 5 visits, face B has appeared in 2 of 5 visits, and faces C, D, E, F, G, H, I, J, K, and L have appeared in 1 of 5 visits. Since at this point the minimum number of visits of the MAC address have been detected, the relative probabilities of each of the Candidate Faces can be evaluated. In this step, the normalized probability is then ¼ for face A, ⅛ for face B, and ¹⁄₁₆ for face C-L.

Further, if the minimum acceptable probability, $P_{min}$, is ⅛, then Candidate Faces A and B pass the threshold while the rest is dropped out. It can then be seen that the maximum calculated probability is ¼ for face A. Also, if the difference in probability from the first-to-second most probable Candidate Faces, $L_{min}$, is set to ⅛, Candidate Face A can be selected as the match, since there is ⅛ difference in probability between A and B.

While one particular application was presented in this example, there are many other possible applications for the embodiments presented. For instance, matching faces with the MAC address of a mobile device could be extremely useful for security personnel at a facility, such as a sporting venue, airport, retail location, restaurant, amusement park, or any other publicly-accessible location. Security personnel may be interested in recognizing, identifying, and tracking individuals who return to a location over time.

Hardware Configuration

One of ordinary skill in the art would recognize that the sets of cameras utilized for the exemplary embodiments, for example as illustrated in FIGS. 1 and 2, can be ordinary surveillance cameras, high-definition cameras, low-cost surveillance cameras, infrared cameras, or other image detection devices. A preferred embodiment of the present invention has the cameras configured as to be installed in the ceiling of a physical location, but one skilled in the art would understand that the cameras could be installed in other locations, such as the walls of the location, behind a mirror, on or associated with a display, aisle or shelf hardware, or railing.

One of ordinary skill in the art would also recognize that the access points (APs) or simply mobile signal sensors (capable of sensing mobile radio signals including WiFi and Bluetooth), for example as illustrated in FIG. 1, can be located in plain view of persons in a physical location, but also out of sight in a ceiling or other fixture. The AP can be a consumer AP device, commercial AP device, beacon device, or any other device capable of operating as an access point or a sensor for Wi-Fi, Bluetooth, or other wireless modality.

Both the cameras and AP hardware can be connected by a wired network, including, but not limited to, an Ethernet based network. The cameras and AP hardware can also be connected by a wireless network, including, but not limited to, a Wi-Fi network, Bluetooth network, nearfield communications (NFC) network, or other type of wireless network. A wired or wireless network can be controlled by a central server or each device can operate as an independent, "Internet of things" device. The network can be connected to the Internet to transfer data, including, but not limited to, raw data and processed data and analytics, to a remote location.

The computing hardware utilized to implement the processes and modules used in the present invention can be configured and controlled via a user-input device, including, but not limited to, a keyboard, mouse, trackpad, trackball, or remote control. Additionally, the hardware can be configured and controlled via remote access through a secure Internet connection. Any data captured and created, including both raw data and processed data and analytics, by the system can be output to a user using a display, printout, or transmitted to a remote location for further analysis.

Figure 17:
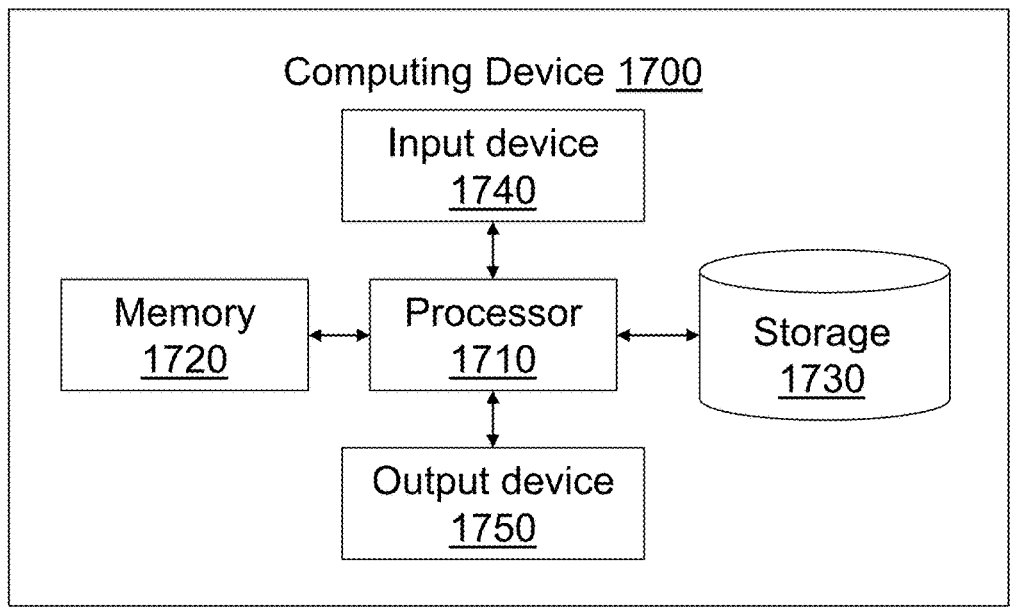
FIG. 17 shows an example computing device illustration.

FIG. 17 shows an example of a generic computer device or a generic mobile computer device, which may be used to implement the processes and modules of the present invention. The computer devices can include many forms of devices, such as desktops, workstations, servers, laptops, personal computers, personal digital assistants, single board computers such as the Raspberry Pi, and other computing devices. Mobile computing devices can include cellular telephones, smartphones, personal digital assistants, or other mobile devices. It should be understood that the computing devices and mobile computing devices listed are exemplary, and not intended to limit the implementation of the processes and modules disclosed in the present invention.

The computing device 1700 includes a processor 1710, memory 1720 (such as Random Access Memory or RAM), storage 1730 (such as a hard disk drive), input device 1740 (such as a keyboard, trackball, trackpad, or mouse), and output device 1750 (such as a CRT, LCD, or other type of display device, and an auditory device such as speakers).

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for associating a physically identifiable feature of a person with a unique identifier of a mobile device utilizing at least a camera, at least a mobile signal sensor, and at least a processor for the association comprising the following steps, repeated for each visit of the mobile device:
   a. detecting the unique identifier of the mobile device using a mobile signal sensor for at least one physical location using a Mobile Device Visit Detection module, wherein a Mobile Device Visit Detection module captures a timestamp indicating the time when the mobile device was detected,
   b. capturing a plurality of input images of a face of at least a person at the physical location using at least a camera using a Candidate Face Collection module, wherein the Candidate Face Collection module captures the plurality of input images during a period of time when the mobile device was detected by the mobile signal sensors at the physical location,
c. storing the unique identifier of the mobile device and plurality of input images in a database,
d. clustering the plurality of input images into a face group using a Face Clustering module, and
e. matching a particular face group to a particular mobile device using a Face to Mobile Matching module.

2. The method of claim 1, wherein the unique identifier of the mobile device is the MAC address of the radio of the mobile device, and wherein the Face to Mobile Matching module uses the MAC address of the device to match a particular face group to a particular mobile device.

3. The method of claim 1, wherein the database includes unique identifier data and plurality of input image data captured from at least one physical locations.

4. The method of claim 3, wherein the database further includes timestamp and location data of the mobile device, and timestamp and location data for the plurality of input images.

5. The method of claim 1, wherein the Mobile Device Visit Detection module captures a timestamp and location for the mobile device, and the Candidate Face Collection module records timestamp and location information for the plurality of input images.

6. The method of claim 1, wherein the period of time when the Candidate Face Collection module captures the plurality of input images satisfies $t_{in} - \Delta t < t < t_{out} + \Delta t$, where $t_{in}$ is the time when the mobile device is first detected by the mobile signal sensor at the physical location, $t_{out}$ is the time when the mobile device is last detected by the mobile signal sensor at the physical location, t is at least one moment when the Candidate Face Collection module captures the plurality of input images, and $\Delta t$ is a predetermined amount of time used to account for a delay between when the mobile device enters or exits the physical location and when it is detected by the mobile signal sensor.

7. The method of claim 1, wherein the Face to Mobile Matching module further comprises the computation of the probability that a particular face group matches a given mobile device using a Face-to-Mobile Matching Probability Computation module, and wherein the best match is determined by finding the face group with the maximum probability of a match given the mobile device using the Best Matching Discovery module.

8. The method of claim 7, wherein the probability that a particular face group matches a given mobile device is computed based on how frequently the particular face group is captured in the physical space at the times when the given mobile device is detected within the physical space.

9. The method of claim 7, further comprising a Candidate Face Dropout module, wherein the Candidate Face Dropout module drops from consideration a face group with a probability calculated to be less than a defined threshold.

10. The method of claim 1, further incorporating constraints comprising a minimum number of visits of a mobile device, a minimum probability of association of a particular face group to a particular mobile device, and a minimum difference from the most probable face group to the next most probable face group.

11. The method of claim 1, wherein the clustering of the input images into face groups is based on the similarity of the faces in a feature space.

12. The method of claim 11, wherein the clustering of the input images into face groups comprises Hierarchical Agglomerative Clustering or Iterative K-Mean clustering.

13. A system for associating a physically identifiable feature of a person with a unique identifier of a mobile device utilizing at least a camera, at least a mobile signal sensor, and at least a processor for the association comprising the following steps, repeated for each visit of the mobile device:
a. detecting the unique identifier of the mobile device using a mobile signal sensor for at least one physical location using a Mobile Device Visit Detection module, wherein a Mobile Device Visit Detection module captures a timestamp indicating the time when the mobile device was detected,
b. capturing a plurality of input images of a face of at least a person at the physical location using at least a camera using a Candidate Face Collection module, wherein the Candidate Face Collection module captures the plurality of input images during a period of time when the mobile device was detected by the mobile signal sensors at the physical location,
c. storing the unique identifier of the mobile device and plurality of input images in a database,
d. clustering the plurality of input images into a face group using a Face Clustering module, and
e. matching a particular face group to a particular mobile device using a Face to Mobile Matching module.

14. The system of claim 13, wherein the unique identifier of the mobile device is the MAC address of the radio of the mobile device, and wherein the Face to Mobile Matching module uses the MAC address of the device to match a particular face group to a particular mobile device.

15. The system of claim 13, wherein the database includes unique identifier data and plurality of input image data captured from at least one physical locations.

16. The system of claim 15, wherein the database further includes timestamp and location data of the mobile device, and timestamp and location data for the plurality of input images.

17. The system of claim 13, wherein the Mobile Device Visit Detection module captures a timestamp and location for the mobile device, and the Candidate Face Collection module records timestamp and location information for the plurality of input images.

18. The system of claim 13, wherein the period of time when the Candidate Face Collection module captures the plurality of input images satisfies $t_{in} - \Delta t < t < t_{out} + \Delta t$, where $t_{in}$ is the time when the mobile device is first detected by the mobile signal sensor at the physical location, $t_{out}$ is the time when the mobile device is last detected by the mobile signal sensor at the physical location, t is at least one moment when the Candidate Face Collection module captures the plurality of input images, and $\Delta t$ is a predetermined amount of time used to account for a delay between when the mobile device enters or exits the physical location and when it is detected by the mobile signal sensor.

19. The system of claim 13, wherein the Face to Mobile Matching module further comprises the computation of the probability that a particular face group matches a given mobile device using a Face-to-Mobile Matching Probability Computation module, and wherein the best match is determined by finding the face group with the maximum probability of a match given the mobile device using the Best Matching Discovery module.

20. The system of claim 19, wherein the probability that a particular face group matches a given mobile device is computed based on how frequently the particular face group is captured in the physical space at the times when the given mobile device is detected within the physical space.

21. The system of claim 19, further comprising a Candidate Face Dropout module, wherein the Candidate Face Dropout module drops from consideration a face group with a probability calculated to be less than a defined threshold.

22. The system of claim 13, further incorporating constraints comprising a minimum number of visits of a mobile device, a minimum probability of association of a particular face group to a particular mobile device, and a minimum difference from the most probable face group to the next most probable face group.

23. The system of claim 13, wherein the clustering of the input images into face groups is based on the similarity of the faces in a feature space.

24. The system of claim 23, wherein the clustering of the input images into face groups comprises Hierarchical Agglomerative Clustering or Iterative K-Mean clustering.

* * * * *